United States Patent
Wanjari

(10) Patent No.: US 10,402,164 B1
(45) Date of Patent: Sep. 3, 2019

(54) METHOD FOR MERGE SORT BY REPRESENTATION

(71) Applicant: EMC IP Holding Company LLC, Hopkinton, MA (US)

(72) Inventor: Tejas Wanjari, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 15/390,399

(22) Filed: Dec. 23, 2016

(51) Int. Cl.
*G06F 16/00* (2019.01)
*G06F 7/16* (2006.01)
*G06F 7/08* (2006.01)
*G06F 16/22* (2019.01)

(52) U.S. Cl.
CPC ............ *G06F 7/16* (2013.01); *G06F 7/08* (2013.01); *G06F 16/2237* (2019.01)

(58) Field of Classification Search
CPC ........ G06F 7/16; G06F 7/08; G06F 17/30324; G06F 16/2237
USPC ...................................................... 707/753
See application file for complete search history.

(56) References Cited

U.S. PATENT DOCUMENTS

| | | | | |
|---|---|---|---|---|
| 6,311,188 B1 * | 10/2001 | van der Linden | ........ | G06F 7/76 707/696 |
| 2004/0139118 A1 * | 7/2004 | Yach | ........... | G06F 7/24 |
| 2009/0313208 A1 * | 12/2009 | Helfman | ........... | G06F 16/2255 |
| 2011/0246503 A1 * | 10/2011 | Bender | ............ | G06F 9/546 707/769 |
| 2013/0282974 A1 * | 10/2013 | Joisha | .............. | G11C 19/00 711/109 |
| 2014/0337362 A1 * | 11/2014 | Goldstein | ............ | G06F 7/32 707/752 |
| 2015/0269119 A1 * | 9/2015 | Sreedhar | ............ | G06F 15/8015 712/22 |
| 2016/0171030 A1 * | 6/2016 | Inoue | ............... | G06F 17/30988 707/753 |
| 2017/0060944 A1 * | 3/2017 | Khayyat | ........... | G06F 16/24537 |

\* cited by examiner

*Primary Examiner* — Thanh-Ha Dang
(74) *Attorney, Agent, or Firm* — Womble Bond Dickinson (US) LLP

(57) ABSTRACT

In one embodiment, a data recovery system sorts data elements of a data array by representation. The data recovery system allocates a representation array corresponding to a position of a corresponding data array element after sorting. A scan module of the data recovery system assigns index values to the representation elements of the representation array based on the values of the data elements of the data array without moving the data elements of the data array. A sort module of the data recovery system swaps the data elements of the data array based on the index values of the representation elements of the representation array corresponding to the data elements. The sort module swaps representation elements of the representation array corresponding to the swapped data elements of the data array.

21 Claims, 9 Drawing Sheets

| 0 | 1 | 2 | 3 | 4 | 5 | 6 | 7 | 8 |
|---|---|---|---|---|---|---|---|---|
| 400 | 500 | 700 | 900 | 1100 | 100 | 300 | 800 | 1200 |

Unsorted Data Array 300 lo=0; mid=4; hi=8

FIG. 3

| | 0 | 1 | 2 | 3 | 4 | 5 | 6 | 7 | 8 |
|---|---|---|---|---|---|---|---|---|---|
| Pass 1: i=0; j=6; k=1 | 400 | 500 | 700 | 900 | 1100 | 300 | 500 | 800 | 1200 |
| | | | | | | | | | |
| Pass 2: i=0; j=7; k=2 | 400 | 500 | 700 | 900 | 1100 | 300 | 500 | 800 | 1200 |
| | 2 | | | | | | | | |
| Pass 3: i=1; j=7; k=3 | 400 | 500 | 700 | 900 | 1100 | 300 | 500 | 800 | 1200 |
| | 2 | 3 | | | | | 1 | | |
| Pass 4: i=2; j=7; k=4 | 400 | 500 | 700 | 900 | 1100 | 300 | 500 | 800 | 1200 |
| | 2 | 3 | 4 | | | 0 | 1 | | |
| Pass 5: i=3; j=7; k=5 | 400 | 500 | 700 | 900 | 1100 | 300 | 500 | 800 | 1200 |
| | 2 | 3 | 4 | | | 0 | 1 | | |
| Pass 6: i=3; j=8; k=6 | 400 | 500 | 700 | 900 | 1100 | 300 | 500 | 800 | 1200 |
| | 2 | 3 | 4 | 6 | | 0 | 1 | 5 | |
| Pass 7: i=4; j=8; k=7 | 400 | 500 | 700 | 900 | 1100 | 300 | 500 | 800 | 1200 |
| | 2 | 3 | 4 | 6 | 7 | 0 | 1 | 5 | |
| Pass 8: i=5; j=8; k=8 | 400 | 500 | 700 | 900 | 1100 | 300 | 500 | 800 | 1200 |
| | 2 | 3 | 4 | 6 | 7 | 0 | 1 | 5 | |
| Pass 9: i=5; j=9; k=9 | 400 | 500 | 700 | 900 | 1100 | 300 | 500 | 800 | 1200 |
| | 2 | 3 | 4 | 6 | 7 | 0 | 1 | 5 | 9 |

| Pass 0: r=0 | 0 | 1 | 2 | 3 | 4 | 5 | 6 | 7 | 8 |
|---|---|---|---|---|---|---|---|---|---|
| | 400 | 500 | 700 | 900 | 1100 | 100 | 300 | 800 | 1200 |
| | 2 | 3 | 4 | 6 | 7 | 0 | 1 | 5 | 8 |

| Pass 1: r=0 | 0 | 1 | 2 | 3 | 4 | 5 | 6 | 7 | 8 |
|---|---|---|---|---|---|---|---|---|---|
| | 700 | 500 | 400 | 900 | 1100 | 100 | 300 | 800 | 1200 |
| | 4 | 3 | 2 | 6 | 7 | 0 | 1 | 5 | 8 |

| Pass 2: r=0 | 0 | 1 | 2 | 3 | 4 | 5 | 6 | 7 | 8 |
|---|---|---|---|---|---|---|---|---|---|
| | 1100 | 500 | 400 | 900 | 700 | 100 | 300 | 800 | 1200 |
| | 7 | 3 | 2 | 6 | 4 | 0 | 1 | 5 | 8 |

| Pass 3: r=0 | 0 | 1 | 2 | 3 | 4 | 5 | 6 | 7 | 8 |
|---|---|---|---|---|---|---|---|---|---|
| | 800 | 500 | 400 | 900 | 700 | 100 | 300 | 800 | 1200 |
| | 5 | 3 | 2 | 6 | 4 | 0 | 1 | 5 | 8 |

| Pass 4: r=0 | 0 | 1 | 2 | 3 | 4 | 5 | 6 | 7 | 8 |
|---|---|---|---|---|---|---|---|---|---|
| | 100 | 500 | 400 | 900 | 700 | 800 | 300 | 1100 | 1200 |
| | 0 | 3 | 2 | 6 | 4 | 5 | 1 | 7 | 8 |

| Pass 5: r=1 | 0 | 1 | 2 | 3 | 4 | 5 | 6 | 7 | 8 |
|---|---|---|---|---|---|---|---|---|---|
| | 100 | 900 | 400 | 500 | 700 | 800 | 300 | 1100 | 1200 |
| | 0 | 6 | 2 | 3 | 4 | 5 | 1 | 7 | 8 |

| Pass 6: r=1 | 0 | 1 | 2 | 3 | 4 | 5 | 6 | 7 | 8 |
|---|---|---|---|---|---|---|---|---|---|
| | 100 | 300 | 400 | 500 | 700 | 800 | 900 | 1100 | 1200 |
| | 0 | 1 | 2 | 3 | 4 | 5 | 6 | 7 | 8 |

| Pass 7: r=1 | 0 | 1 | 2 | 3 | 4 | 5 | 6 | 7 | 8 |
|---|---|---|---|---|---|---|---|---|---|
| | 100 | 300 | 400 | 500 | 700 | 800 | 900 | 1100 | 1200 |
| | 0 | 1 | 2 | 3 | 4 | 5 | 6 | 7 | 8 |

| Pass 8: r=2 | 0 | 1 | 2 | 3 | 4 | 5 | 6 | 7 | 8 |
|---|---|---|---|---|---|---|---|---|---|
| | 100 | 300 | 400 | 500 | 700 | 800 | 900 | 1100 | 1200 |
| | 0 | 1 | 2 | 3 | 4 | 5 | 6 | 7 | 8 |

```
private static void repMerge(Comparable [] data, int[] rep, int lo, int mid, int hi) {
    int i = lo, j = mid + 1;
    // Phase 1:
    for (int k = lo; k <= hi; k++) {
        if (i > mid)
            rep[j++] = k;
        else if (j > hi)
            rep[i++] = k;
        else if (data[j] < data[i])
            rep[j++] = k;
        else
            rep[i++] = k;
    }
    // Phase 2:
    for (int r = 0; r <= hi;) {
        if (rep[r] != r) {
            exchg(data, r, rep[r]);    // exchg: swapping elements
            exchg(rep, r, rep[r]);     // exchg: swapping elements
            continue;
        }
        r++;
    }
}
```

FIG. 8

METHOD FOR MERGE SORT BY REPRESENTATION

FIELD OF THE INVENTION

Embodiments of the present invention relate generally to data recovery systems. More particularly, embodiments of the invention relate to merge sort by representation of data arrays in data recovery systems.

BACKGROUND

Clients may backup data files to a data recovery system. Data files may be merge sorted as they are read from the client machines at the client end or the server end. As data are sorted, it is critical to reduce the memory utilization of the backup programs to reduce failure rates due to insufficient resources such as memory.

Merge sort is an efficient general-purpose comparison-based sorting algorithm. It is a divide and conquer algorithm. Conceptually, a merge sort works by dividing an unsorted list into N sublists, each containing one element, and repeatedly merge the sublists to produce new sorted sublists until there is only one sublist remaining. In sorting n objects, merge sort has an average and worst case performance of O(N log N).

One drawback of merge sort, when implemented on arrays is its O(N) memory requirement to make an auxiliary array of size N for sorting n elements. For example, to sort an array of 100 elements with elements of size 1 MB, an auxiliary array of 100 MB or an additional of 100 MB of memory allocation is required to merge sort. If an array of 100 elements has element of size 100 MB, an auxiliary array of 10 GB or an additional of 10 GB of memory allocation is required to merge sort. A need had arisen to reduce the memory allocation for a merge sort operation to reduce back-up failure rates due to insufficient memory resources.

BRIEF DESCRIPTION OF THE DRAWINGS

Embodiments of the invention are illustrated by way of example and not limitation in the figures of the accompanying drawings in which like references indicate similar elements.

FIG. 3 is a diagram illustrating an example of an unsorted data array to be merge-sorted by representation according to one embodiment of the invention.

FIG. 4 is a diagram illustrating an example of the data in memory after each pass of sort by representation for phase one (representation phase) according to one embodiment of the invention.

FIG. 6 is a diagram illustrating an example of the data in memory after each pass of sort by representation for phase two (sort phase) according to one embodiment of the invention.

FIG. 8 is a diagram illustrating an example pseudocode of merge sort by representation according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a data recovery system sorts data elements of a data array by representation. The data recovery system allocates a representation array corresponding to the data array to be sorted, such that the representation array includes a number of representation elements and each of the representation elements corresponds to one of the data elements of the data array. A scan module of the data recovery system assigns index values to the representation elements of the representation array based on the values of the data elements of the data array without moving the data elements of the data array. A sort module of the data recovery system swaps the data elements of the data array based on the index values of the representation elements of the representation array corresponding to the data elements. The sort module swaps representation elements of the representation array corresponding to the swapped data elements of the data array.

Figure 1:
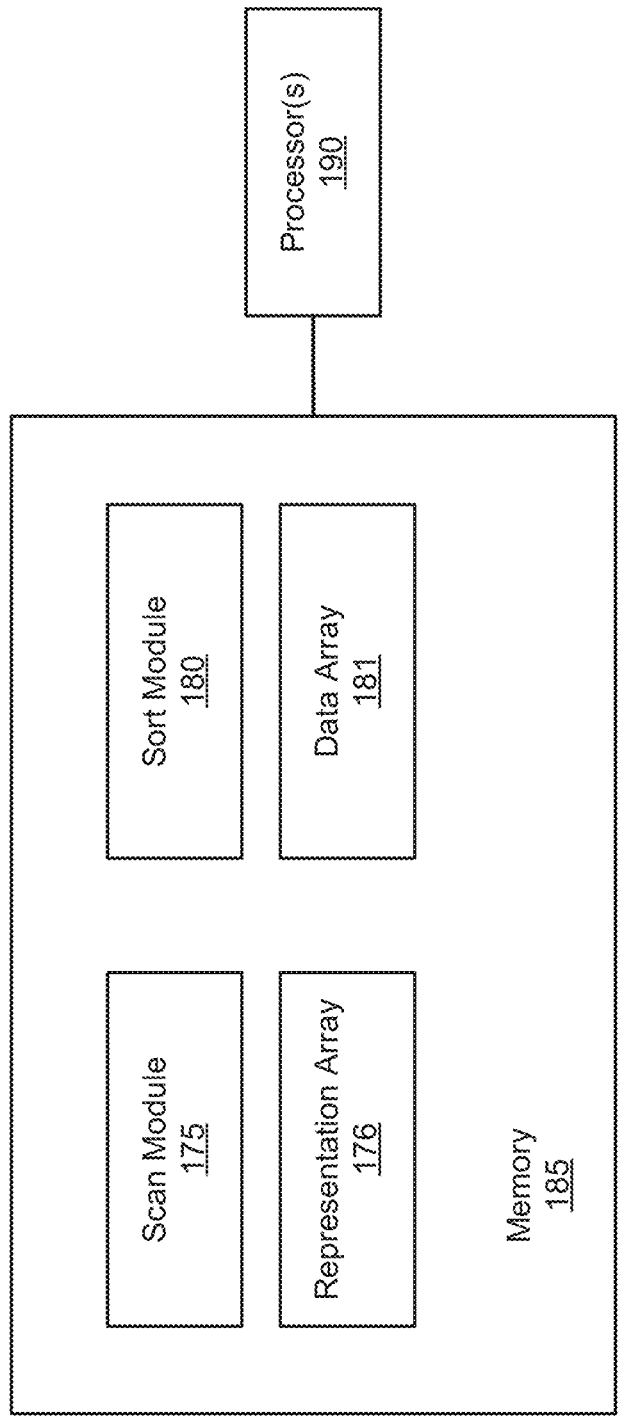
FIG. 1 is a block diagram illustrating a computer system according to one embodiment of the invention.

FIG. 1 is a block diagram illustrating a computer system 170 according to one embodiment of the invention. Computer system 170 has memory 185 and processor(s) 190. Memory 185 includes scan module 175, representation array 176, sort module 180, and data array 181. Memory 185 may be cache or system memory.

Referring to FIG. 1, data array 181 is a data array to be sorted by the two-phase merge sort by representation. Computer system 170 or scan module 175 allocates representation array 176 in-memory. Scan module 175 performs phase one of a two-phase representation merge sort by scanning data elements of the data array and assigning representation index values to elements of representation array 176 to store representation index values corresponding to data elements of data array 181. Data elements of the data array 181 are unaltered. When all elements of representation array 176 are assigned an index value, sort module 180 swaps the data elements of data array 181 and elements of representation array 176 according to the representation index values of the representation array 176. The swapping process is iteratively performed until the index values of the representation array are in accordance with a predetermined order.

Figure 2:
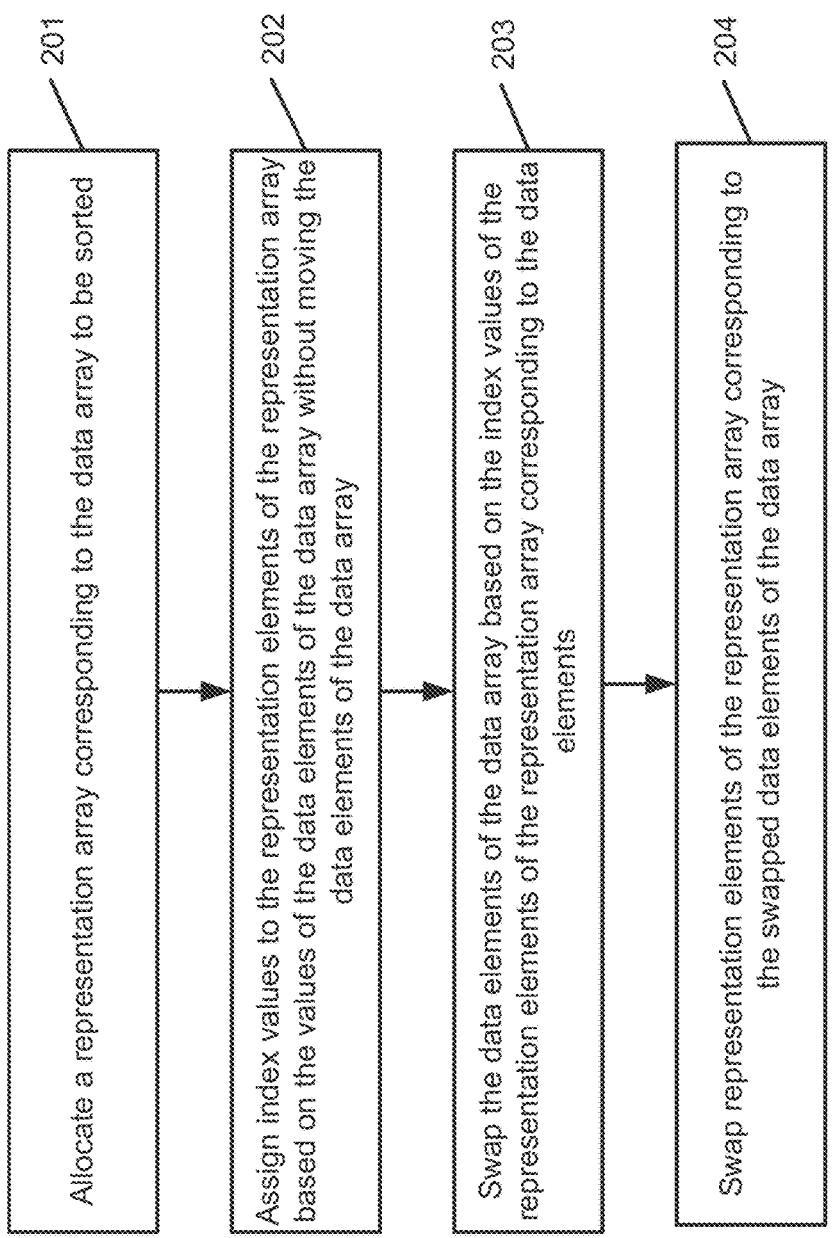
FIG. 2 is a flowchart illustrating an example method for a sort by representation according to one embodiment of the invention.

FIG. 2 is a flow diagram illustrating a process of sort by representation according to one embodiment of the invention. Process 200 may be performed by processing logic that includes hardware (e.g. circuitry, dedicated logic, etc.), software (e.g., embodied on a non-transitory computer readable medium), or a combination thereof. For example, process 200 may be performed by scan module 175 or sort module 180 of computer system 170 of FIG. 1. Referring to FIG. 2, at block 201, processing logic allocates a representation array corresponding to the data array to be sorted, such that the representation array includes a plurality of representation elements and each of the representation elements corresponds to one of the data elements of the data array. At block 202, processing logic assigns index values to the representation elements of the representation array based on the values of the data elements of the data array without moving the data elements of the data array. At block 203, process logic swaps the data elements of the data array based on the index values of the representation elements of the representation array corresponding to the data elements. At block 204, process logic swaps representation elements of the representation array corresponding to the swapped data elements of the data array.

In one embodiment, sort module 180 swaps data elements of data array 181 and elements of representation array 176 iteratively until the stored index values of the representation array 176 are in a predetermined sorted order. In another embodiment, the stored indices values of the representation array 176 represents the indices values of the corresponding data elements of the data array 181 in a sorted order.

In one embodiment, data array 181 includes a first portion having a first subset of data elements and a second portion having a second subset of data elements. The first and second subsets of data elements may be in a sorted order. In another embodiment, scan module 175 merges the first and the second portions by assigning index values to the elements of representation array 176 corresponding to the data elements of the first and the second portions without moving the data elements of the first and the second portions. In another embodiment, when all of the data elements of the first subset of data elements have been represented by corresponding index values, a next available index value is assigned to the representation element corresponding to the next data element of the second subset of data elements that is not represented by a corresponding index value. When all of the data elements of the second subset of data elements have been represented by corresponding index values, a next available index value is assigned to the representation element corresponding to the next data element of the first subset of data elements that is not represented by a corresponding index value. If a next data element of the first subset of data elements that is not represented by a corresponding index value is greater than next data element of the second subset of data elements that is not represented by a corresponding index value, a next available index value is assigned to the representation element corresponding to the next data element of the second subset of data elements that is not represented by a corresponding index value; and otherwise, a next available index value is assigned to the representation element corresponding to the next data element of the first subset of data elements that is not represented by a corresponding index value. In another embodiment, merging of the first and the second subsets of data elements are performed iteratively until all of the data elements of the first and the second subset of data elements have been represented by corresponding index values.

FIG. 3 is a diagram illustrating an example data array to be merge-sorted by representation according to one embodiment of the invention. The example data array is listed in the second row with nine data elements: 400, 500, 700, 900, 1100, 100, 300, 800, and 1200. The data elements have respective index values zero to eight denoted by the first row. The third row is a representative array. Variables lo, mid, and hi has initial values lo=0, mid=4, hi=8.

FIG. 4 is a diagram illustrating the in-memory values of an example representation array and data array after multiple passes of phase one of a sort by representation of the data array of FIG. 3. In one embodiment, the sort by representation may be performed by processing logic that includes hardware (e.g. circuitry, dedicated logic, etc.), software (e.g., embodied on a non-transitory computer readable medium), or a combination thereof. For example, the sort by representation may be performed by scan module 175 of computer system 170 of FIG. 1. Referring to FIG. 4, processing logic scans the data elements of data array that is not assigned a representation value for the smallest data element and assigns an index value to the correspond representation element. The rescan is performed iteratively until the representation array is fully populated.

For example, referring to FIG. 4, in Pass 1, processing logic scans the data elements of the data array for the lowest value, i.e., 100, and assigns the corresponding representation element with index 0, i.e., rep[5]=0. An implementation may use an index buffer (not shown) to store an index value of the data element having the lowest value. Processing logic traverses the data elements of the data array that is not assigned a representation index value, and compares the data elements with the stored index buffer data element to determine the lowest value data element. The index buffer (not shown) is updated according to a new low value. In Pass 2, processing logic resets the index buffer (not shown) and rescans for a next lowest value, i.e., 300, and assigns the corresponding representation element with a next index, i.e., rep[6]=1. The rescan is performed iteratively until the representation array is fully populated, as shown in Pass 9.

Figure 5:
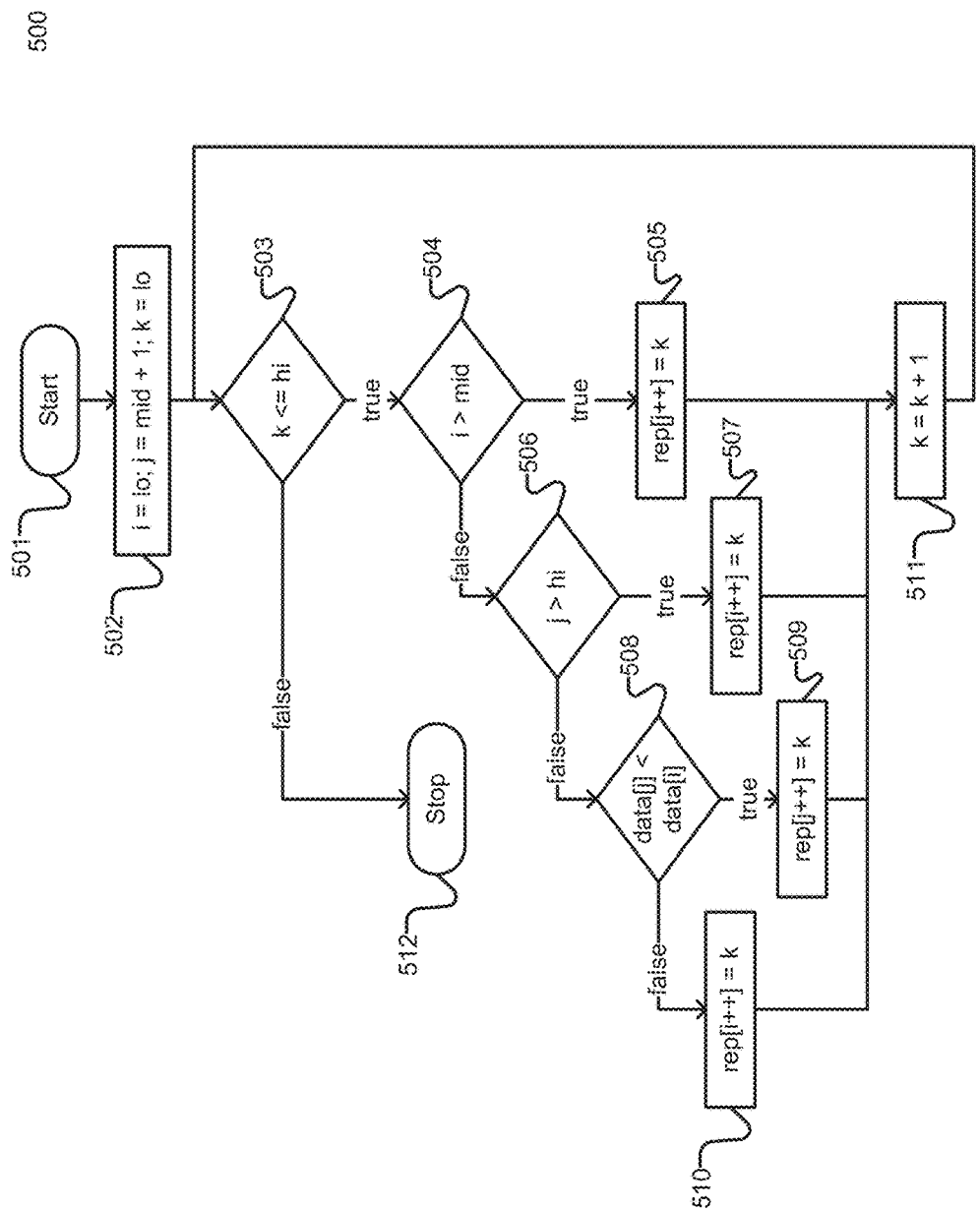
FIG. 5 is a flow diagram of an example method for phase one (representation phase) of a two-phase merge sort by representation according to one embodiment of the invention.

In another embodiment, the sort by representation of FIG. 4 may be a merge sort by representation. FIG. 5 is a flow diagram illustrating a process of phase one of merge sort by representation according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by scan module 175 of computer system 170 of FIG. 1.

Referring to FIGS. 4 and 5, in Pass 1 of FIG. 4, processing logic starts at block 501 with lo=0, mid=4, hi=8. At block 502, processing logic assigns i=0; j=mid+1=5; k=0. Processing logic enters block 503 and determines k<=hi is true. Processing logic enters block 504 and determines i>mid is false. Process logic enters block 506 and determines j>hi is false. Processing logic enters block 508 and determines data[j]=100 is smaller than <data[i]=400. Processing logic enters block 509 and assigns rep[5] a zero and increments variable j. Processing logic enter block 511 and increments variable k. Note the variables i, j, k values in FIG. 4 are in-memory values after the corresponding pass.

In Pass 2 of FIG. 4, processing logic starts at block 503 with i=0; j=6; k=1. At block 503, process logic determines k<=hi is true. At blocks 504, processing logic determines i>mid is false. At blocks 506, processing logic determines j>hi is false. At block 508, processing logic determines data[j]<data[i], or 100<400 is true. At block 509, processing logic assigns rep[6]=1 and increments variable j. At block 511, processing logic increments variable k.

In Pass 3 of FIG. 4, processing logic starts at block 503 with i=0; j=7; k=2. At block 503, process logic determines k<=hi is true. At blocks 504, processing logic determines i>mid is false. At blocks 506, processing logic determines j>hi is false. At block 508, processing logic determines data[j]<data[i], or 800<400 is false. Processing logic enters block 510 and assigns rep[0]=2 and increments variable i. At block 511, processing logic increments variable k.

In Pass 4 of FIG. 4, processing logic starts at block 503 with i=1; j=7; k=3. At block 503, process logic determines k<=hi is true. At blocks 504, processing logic determines i>mid is false. At blocks 506, processing logic determines j>hi is false. At block 508, processing logic determines data[j]<data[i], or 800<500 is false. At block 510, processing logic assigns rep[1]=3 and increments variable i. At block 511, processing logic increments variable k.

In Pass 5 of FIG. 4, processing logic starts at block 503 with i=2; j=7; k=4. At block 503, process logic determines k<=hi is true. At blocks 504, processing logic determines i>mid is false. At blocks 506, processing logic determines j>hi is false. At block 508, processing logic determines data[j]<data[i], or 800<700 is false. Processing logic enters block 510 and assigns rep[2]=4 and increments variable i. At block 511, processing logic increments variable k.

In Pass 6 of FIG. 4, processing logic starts at block 503 with i=3; j=7; k=5. At block 503, process logic determines k<=hi is true. At blocks 504, processing logic determines i>mid is false. At blocks 506, processing logic determines j>hi is false. At block 508, processing logic determines data[j]<data[i], or 800<900 is true. Processing logic enters block 509 and assigns rep[7]=5 and increments variable j. At block 511, processing logic increments variable k.

In Pass 7 of FIG. 4, processing logic starts at block 503 with i=3; j=8; k=6. At block 503, process logic determines k<=hi is true. At blocks 504, processing logic determines i>mid is false. At blocks 506, processing logic determines j>hi is false. At block 508, processing logic determines data[j]<data[i], or 1200<900 is false. Processing logic enters block 510 and assigns rep[3]=6 and increments variable i. At block 511, processing logic increments variable k.

In Pass 8 of FIG. 4, processing logic starts at block 503 with i=4; j=8; k=7. At block 503, process logic determines k<=hi is true. At blocks 504, processing logic determines i>mid is false. At blocks 506, processing logic determines j>hi is false. At block 508, processing logic determines data[j]<data[i], or 1200<1100 is false. Processing logic enters block 510 and assigns rep[4]=7 and increments variable i. At block 511, processing logic increments variable k.

In Pass 9 of FIG. 4, processing logic starts at block 503 with i=5; j=8; k=8. At block 503, process logic determines k<=hi is true. At blocks 504, processing logic determines i>mid is true. Processing logic enters block 505 and assigns rep[8]=8. At block 511, processing logic increments variable k.

In Pass 10 (not shown) of FIG. 4, processing logic enters block 503 and determines k<=hi is false and enters block 512 stop. The in-memory representation array in Pass 9 is the representation array after phase one of the two-phase merge sort by representation.

FIG. 6 is a diagram illustrating the in-memory values of an example representation array and data array after multiple passes of phase two of sort by representation of the example representation array in Pass 9 of FIG. 4. In one embodiment, the sort by representation may be performed by processing logic that includes hardware (e.g. circuitry, dedicated logic, etc.), software (e.g., embodied on a non-transitory computer readable medium), or a combination thereof. For example, the sort by representation may be performed by sort module 180 of computer system 170 of FIG. 1. Referring to FIG. 6, processing logic receives the representation elements of data array and swaps the representation elements along with their corresponding data elements according to the assigned index values in the representation elements. For example, processing logic may can the representation array and look for the representation element with stored index equal 0, e.g., rep[5]=0, and swaps it with representation element at index zero, e.g., rep[0]=2. Data elements are also swapped, e.g., data[0]=400 is swapped with data[5]=100. Swapping is performed iteratively until the index value of the representation elements match the stored index values in the representation elements. In another embodiment, processing logic may traverse the representation array (i.e., start at index 0 and increment) and swap the data and representation elements according to the stored index value in the representation elements. Swapping is performed iteratively until the index value of the representation elements match the stored index values in the representation elements.

Figure 7:
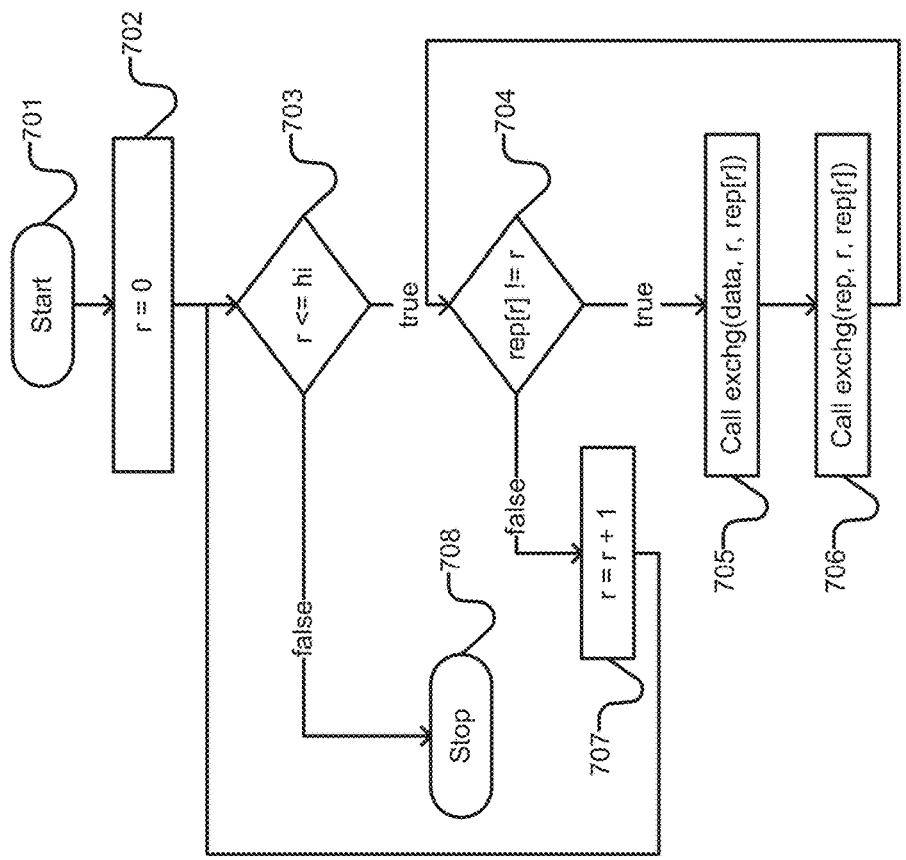
FIG. 7 is a flow diagram of an example method for phase two (sort phase) of a two-phase merge sort by representation according to one embodiment of the invention.

FIG. 7 is a flow diagram illustrating a process of phase two of sort by representation according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by sort module 180 of computer system 170 of FIG. 1.

Referring to FIGS. 6 and 7, Pass 0 of FIG. 6 illustrates an example data and representation array to be processed. In Pass 1 of FIG. 6, processing logic enters block 701 with lo=0, mid=4, hi=8. At block 702, processing logic assigns r=0. Processing logic enters block 703 and determines r<=hi is true. Processing logic enters block 704 and determines rep[r]!=r or 2!=0 is true. Processing logic enters 705 and swaps data array elements of indices 2 (2 is the stored index value of representation array at index 0) and 0. Processing logic enters 706 and swaps representation array elements of indices 2 and 0. For example, processing logic may call or invoke an exchange function to swap the data elements or the representation elements.

In Pass 2 of FIG. 6, processing logic enters block 704 with r=0. At block 704, processing logic determines rep[r]!=r or 4!=0 is true. Processing logic enters 705 and swaps data array elements of indices 4 and 0. Processing logic enters 706 and swaps representation array elements of indices 4 and 0.

In Pass 3 of FIG. 6, processing logic enters block 704 with r=0. At block 704, processing logic determines rep[r]!=r or 7!=0 is true. Processing logic enters 705 and swaps data array elements of indices 7 and 0. Processing logic enters 706 and swaps representation array elements of indices 7 and 0.

In Pass 4 of FIG. 6, processing logic enters block 704 with r=0. At block 704, processing logic determines rep[r]!=r or 5!=0 is true. Processing logic enters 705 and swaps data array elements of indices 5 and 0. Processing logic enters 706 and swaps representation array elements of indices 5 and 0.

In Pass 5 of FIG. 6, processing logic enters block 704 with r=0. At block 704, processing logic determines rep[r]!=r or 0!=0 is false. Processing logic enters 707 and increments r.

In Pass 6 of FIG. 6, processing logic enters block 703 with r=1. At block 703, processing logic determines r<=hi is true. Processing logic enters block 704 and determines rep[r]!=r or 3!=1 is true. Processing logic enters 705 and swaps data array elements of indices 3 (3 is the stored index value of representation array at index 1) and 1. Processing logic enters 706 and swaps representation array elements of indices 3 and 1.

In Pass 7 of FIG. 6, processing logic enters block 704 with r=0. At block 704, processing logic determines rep[r]!=r or 6!=1 is true. Processing logic enters 705 and swaps data array elements of indices 6 (6 is the stored index value of representation array at index 1) and 1. Processing logic enters 706 and swaps representation array elements of indices 6 and 1.

In Pass 8 of FIG. 6, processing logic enters block 704 with r=1. At block 704, process logic determines rep[r]!=r or 1!=1 is false. Processing logic enters 707 and increments r.

In Pass 9 (not shown) of FIG. 6, processing logic enters block 703 with r=2. At block 703, processing logic determines r<=hi is true. Processing logic enters block 704 and determines rep[r]!=r or 2!=2 is false. Processing logic enters 707 and increments r.

Since the index values of representation array and the stored index values in the representation array match as of Pass 7, in each of the subsequent passes (not shown), processing logic enters block 703 to determine r<=hi is true, and block 704 to determine rep[r] !=r is false, until r<=hi is false, or r=9. At which point, processing logic enters block 708 and stops.

Note although the embodiment above illustrates a merge sort with numerical data elements as the data array to be sorted, in another embodiment, the data elements may be a size of hundreds of megabytes or gigabytes. In another embodiment, data elements may be data types of text, binary data, objects, or any data types, or a mix thereof that may be sorted.

FIG. 8 is a diagram illustrating an example pseudocode of a merge sort by representation, according to one embodiment of the invention. Referring to FIG. 8, subroutine repMerge has five input variables: data[ ], rep[ ], lo, mid, and hi. The data[ ] or referenced data array would then be sorted and becomes the output of the subroutine. Exchg subroutine has three input variables: data[ ], r, and rep[r]. Exchg subroutine swaps data elements of data[ ] or the input data array at indices r and rep[r].

Note that merge sort by representation eliminates the memory requirement for an auxiliary array in a merge sort, or an additional O(N) memory for a data array of N data elements. For example, data array with data elements having an average size of S bits requires an additional memory of N*S bits for an auxiliary array in a traditional merge sort. The auxiliary array when replaced with a representation array in contrast has a memory cost of N*log$_2$(N) bits, for N elements. A memory saving is generally achieved when S is much greater than N. Although the sort by representation is applied to a merge sort in the above examples to reduce the memory requirement of an auxiliary array, the process to sort by representation may be applied to quick sort, bubble sort, or heap sort.

Figure 9:
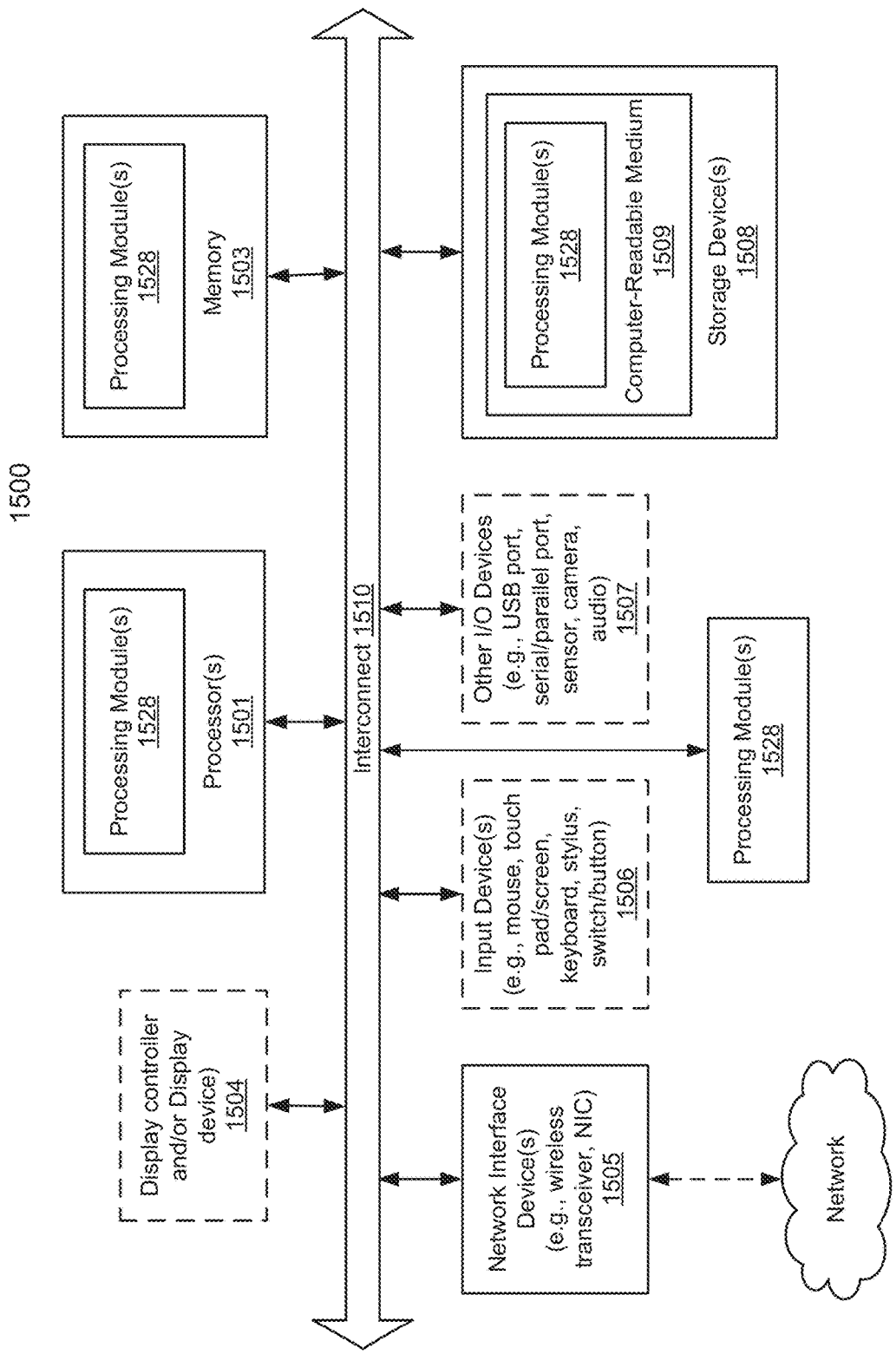
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s)

1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, snapshots module 225, or rollover module 221, 222, and 223 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of creating a sorted data array for use in a data recovery system, comprising:
    allocating, by the data recovery system, a representation array corresponding to the data array to be sorted, wherein the representation array includes a plurality of representation elements, wherein each of the plurality of representation elements corresponds to a position of one of a plurality of data elements of the data array, wherein the plurality of data elements of the data array include one or more of text, binary data, objects, or a mix thereof, and wherein the data array includes index values in an ascending order;
    assigning, by a scan module of the data recovery system, an index value to each of the plurality of representation elements of the representation array based on a value of a corresponding data element of the plurality of data elements of the data array without moving the plurality of data elements of the data array;
    swapping, by a sort module of the data recovery system, one of the plurality of data elements of the data array based on the assigned index value of the representation element of the representation array corresponding to the data element of the data array, to match the assigned index value of the representation element to the index value of the data element of the data array;
    swapping, by the sort module of the data recovery system, the representation element of the representation array to match the representation element to a corresponding swapped data element of the data array; and
    iteratively swapping the remaining data elements of the plurality of data elements of the data array and iteratively swapping the remaining representation elements of the plurality of representation elements of the representation array until the stored index values of the representation array are in a predetermined sorted order.

2. The computer-implemented method of claim 1, wherein the stored index values of the representation array represent the index values of the corresponding data elements of the data array in a sorted order.

3. The computer-implemented method of claim 1, wherein the data array comprises a first portion having a first subset of sorted data elements and a second portion having a second subset of sorted data elements.

4. The computer-implemented method of claim 3, wherein assigning index values comprises merging the first and the second portions by assigning index values to the representation elements corresponding to the data elements of the first and the second portions without moving the data elements of the first and the second portions.

5. The computer-implemented method of claim 4, wherein merging the first and the second subsets of data elements comprises:
    when all of the data elements of the first subset of data elements have been represented by corresponding index values, assigning a next available index value to the representation element corresponding to the next data element of the second subset of data elements that is not represented by a corresponding index value; and
    when all of the data elements of the second subset of data elements have been represented by corresponding index values, assigning a next available index value to the representation element corresponding to the next data element of the first subset of data elements that is not represented by a corresponding index value.

6. The computer-implemented method of claim 5, further comprising:
    if a next data element of the first subset of data elements that is not represented by a corresponding index value is greater than next data element of the second subset of data elements that is not represented by a corresponding index value, assigning a next available index value to the representation element corresponding to the next data element of the second subset of data elements that is not represented by a corresponding index value; and
    otherwise, assigning a next available index value to the representation element corresponding to the next data element of the first subset of data elements that is not represented by a corresponding index value.

7. The computer-implemented method of claim 4, wherein merging the first and the second subsets of data elements are performed iteratively until all of the data elements of the first and the second subset of data elements have been represented by corresponding index values.

8. A non-transitory machine-readable medium having instructions stored therein, which when executed by a processor, cause the processor to perform operations to create a sorted data array for use in a data recovery system, the operations comprising:
    allocating, by the data recovery system, a representation array corresponding to the data array to be sorted, wherein the representation array includes a plurality of representation elements, wherein each of the plurality of representation elements corresponds to a position of one of a plurality of data elements of the data array, wherein the plurality of data elements of the data array include one or more of text, binary data, objects, or a mix thereof, and wherein the data array includes index values in an ascending order;

assigning, by a scan module of the data recovery system, an index value to each of the plurality of representation elements of the representation array based on a value of a corresponding data element of the plurality of data elements of the data array without moving the plurality of data elements of the data array;

swapping, by a sort module of the data recovery system, one of the plurality of data elements of the data array based on the assigned index value of the representation element of the representation array corresponding to the data element of the data array, to match the assigned index value of the representation element to the index value of the data element of the data array;

swapping, by the sort module of the data recovery system, the representation element of the representation array to match the representation element to a corresponding swapped data element of the data array; and iteratively swapping the remaining data elements of the plurality of data elements of the data array and iteratively swapping the remaining representation elements of the plurality of representation elements of the representation array until the stored index values of the representation array are in a predetermined sorted order.

9. The non-transitory machine-readable medium of claim 8, wherein the stored index values of the representation array represent the index values of the corresponding data elements of the data array in a sorted order.

10. The non-transitory machine-readable medium of claim 8, wherein the data array comprises a first portion having a first subset of sorted data elements and a second portion having a second subset of sorted data elements.

11. The non-transitory machine-readable medium of claim 10, wherein assigning index values comprises merging the first and the second portions by assigning index values to the representation elements corresponding to the data elements of the first and the second portions without moving the data elements of the first and the second portions.

12. The non-transitory machine-readable medium of claim 11, wherein merging the first and the second subsets of data elements comprises:

when all of the data elements of the first subset of data elements have been represented by corresponding index values, assigning a next available index value to the representation element corresponding to the next data element of the second subset of data elements that is not represented by a corresponding index value; and when all of the data elements of the second subset of data elements have been represented by corresponding index values, assigning a next available index value to the representation element corresponding to the next data element of the first subset of data elements that is not represented by a corresponding index value.

13. The non-transitory machine-readable medium of claim 12, further comprising:

if a next data element of the first subset of data elements that is not represented by a corresponding index value is greater than next data element of the second subset of data elements that is not represented by a corresponding index value, assigning a next available index value to the representation element corresponding to the next data element of the second subset of data elements that is not represented by a corresponding index value; and otherwise, assigning a next available index value to the representation element corresponding to the next data element of the first subset of data elements that is not represented by a corresponding index value.

14. The non-transitory machine-readable medium of claim 11, wherein merging the first and the second subsets of data elements are performed iteratively until all of the data elements of the first and the second subset of data elements have been represented by corresponding index values.

15. A data processing system, comprising:

a processor; and a memory coupled to the processor to store instructions, which when executed by the processor, cause the processor to perform operations to create a sorted data array for use in a data recovery system, the operations including:

allocating, by the data recovery system, a representation array corresponding to the data array to be sorted, wherein the representation array includes a plurality of representation elements, wherein each of the plurality of representation elements corresponds to a position of one of a plurality of data elements of the data array, wherein the plurality of data elements of the data array include one or more of text, binary data, objects, or a mix thereof, and wherein the data array includes index values in an ascending order;

assigning, by a scan module of the data recovery system, an index value to each of the plurality of representation elements of the representation array based on a value of a corresponding data element of the plurality of data elements of the data array without moving the plurality of data elements of the data array;

swapping, by a sort module of the data recovery system, one of the plurality of data elements of the data array based on the assigned index value of the representation element of the representation array corresponding to the data element of the data array, to match the assigned index value of the representation element to the index value of the data element of the data array; and swapping, by the sort module of the data recovery system, the representation element of the representation array to match the representation element to a corresponding swapped data element of the data array; and iteratively swapping the remaining data elements of the plurality of data elements of the data array and iteratively swapping the remaining representation elements of the plurality of representation elements of the representation array until the stored index values of the representation array are in a predetermined sorted order.

16. The data processing system of claim 15, wherein the stored index values of the representation array represent the index values of the corresponding data elements of the data array in a sorted order.

17. The data processing system of claim 15, wherein the data array comprises a first portion having a first subset of sorted data elements and a second portion having a second subset of sorted data elements.

18. The data processing system of claim 17, wherein assigning index values comprises merging the first and the second portions by assigning index values to the representation elements corresponding to the data elements of the first and the second portions without moving the data elements of the first and the second portions.

19. The data processing system of claim 18, wherein merging the first and the second subsets of data elements comprises:

when all of the data elements of the first subset of data elements have been represented by corresponding index values, assigning a next available index value to the representation element corresponding to the next data element of the second subset of data elements that is not represented by a corresponding index value; and when all of the data elements of the second subset of data elements have been represented by corresponding index values, assigning a next available index value to the representation element corresponding to the next data element of the first subset of data elements that is not represented by a corresponding index value.

20. The data processing system of claim 19, further comprising:

if a next data element of the first subset of data elements that is not represented by a corresponding index value is greater than next data element of the second subset of data elements that is not represented by a corresponding index value, assigning a next available index value to the representation element corresponding to the next data element of the second subset of data elements that is not represented by a corresponding index value; and otherwise, assigning a next available index value to the representation element corresponding to the next data element of the first subset of data elements that is not represented by a corresponding index value.

21. The data processing system of claim 18, wherein merging the first and the second subsets of data elements are performed iteratively until all of the data elements of the first and the second subset of data elements have been represented by corresponding index values.

* * * * *